INVENTORS
WILLIAM J. SAMPLE
GEORGE T. DOWNEY

BY Dicke & Craig
ATTORNEYS

United States Patent Office 3,487,929
Patented Jan. 6, 1970

3,487,929
MECHANICAL-TYPE FILTER BYPASS INDICATOR
William J. Sample, and George T. Downey, Corry, Pa., assignors to Aero-Flow Dynamics, Inc., Corry, Pa.
Filed May 29, 1967, Ser. No. 641,977
Int. Cl. B01d 35/14
U.S. Cl. 210—90                         29 Claims

ABSTRACT OF THE DISCLOSURE

A filter for liquids such as gasoline fuel; more particularly, improvements in filters of this type which are provided with a valve to allow bypass flow of the liquid when the filter elements become clogged, wherein a mechanical indicator is provided to signal an impending bypass condition of the valve, and the mechanical indicator is used either alone or in conjunction with an electrical signalling device; in one construction of the filter provision is made for the mechanical indicator to be positively locked in a visible position when the valve is in a position to allow bypass flow in such a manner that the indicator cannot be reset without first removing the filter elements.

BACKGROUND OF THE INVENTION

The present invention relates to filters for flowing liquids such as gasoline fuel, especially to filter assemblies which are provided with valves or the like to allow bypass flow of the liquid when the filter elements become clogged, wherein a mechanical indicator is provided, either alone or in combination with electrical signalling devices, to signal a clogged condition of the filter elements.

Fuel filter assemblies are provided in nearly all systems in order to deliver to an engine, fuel which is relatively free of contamination. In many systems, such as those utilized in powered aircraft, the necessity for providing continuous fuel flow to the engine is more critical than the requirement for the delivery of decontaminated fuel. For this reason, practically all aircraft fuel systems incorporate a bypass valve which is actuated at a predetermined differential pressure level between the inlet and outlet sides of the fuel filter assembly. Thus, if the filter elements become contaminated, a decrease in fluid pressure occurs at the outlet side of the fuel filter. Correspondingly, the fluid pressure increases at the inlet side of the filter. When a predetermined pressure differential is reached, the bypass valve opens, thus providing an alternate path for the fuel.

Normally, fuel filter assemblies provided with a bypass valve device as described above are provided, additionally, with means for indicating that the predetermined pressure differential across the fuel filter has been reached, ostensibly due to clogged filter elements. The indicating means utilized may be in the form of an electrical switch combination which causes a lamp or similar electrical signalling device to be operated at the predetermined level of pressure differential.

In some instances, it is desirable to supplement the electrical signal with a mechanical signalling device. Under some circumstances, it is desirable to replace the electric signal entirely with a mechanical type device.

The present invention contemplates the provision of a mechanical indicator in a fuel filter equipped with a bypass valve, wherein the indicator is actuated at a predetermined level of pressure differential between the inlet and outlet sides of the fuel filter. Further, the mechanical indicator is of a type which can advantageously be employed in conjunction with electrical signalling devices or as the sole means of alerting service personnel to a clogged condition of the filter elements.

Where a mechanical indicator is employed to alert service personnel that the predetermined level of pressure differential has been reached, it is frequently desirable to provide an indicator which is foolproof; that is, one which service personnel cannot reset to a normal position without first removing the filter elements. This is accomplished, according to one embodiment of the present invention, by utilizing a latch member which positively engages with a spring-loaded button which is projected into a visible position when the bypass valve is in an open condition. With the latch member retaining the button in a visible position, the button cannot be returned to a normal position by force applied from the exterior of the filter assembly.

The latch member, according to the present invention, can be disengaged from the button only by rotation of a shaft upon which the latch member is mounted. Since this shaft is accessible only from the interior space of the filter assembly, and preferably, only after the filter elements have been removed, the indicating button cannot be reset unless the proper remedial steps have been followed.

In order to render the operation of the subject fuel filter fail-safe, it is also within the contemplation of the present invention to provide an electrical signalling device which is arranged so as to be operated simultaneously with the aforementioned mechanical indicator. In this connection, either a normally-closed or normally-open microswitch is connected with a lamp or other signal. If a normally-closed microswitch is employed, it may be arranged in a circuit which is closed only so long as the indicating button is in a normal position, said circuit being broken when the button is in a visible position. Thus, the failure of the lamp or other signal alerts service personnel to inspect the fuel filter and allows them to determine, from the position of the indicating button, whether the filter elements are in need of replacement.

One of the difficulties encountered with the known bypass valve arrangements for fuel filters is that indication of an abnormal flow condition is provided only after the bypass valve has opened and thereby permitted the supply of unfiltered fuel to the engine. This disadvantage is overcome by the fuel filter of the present invention. According to the present invention, the indicator is actuated by a flexible diaphragm rather than by the motion of the bypass valve itself. By the novel arrangement for actuation of the indicator, more fully described hereinbelow, the indicator of the present invention is actuated at some predetermined level of pressure differential less than that which causes the bypass valve to open, and thus, serves to indicate a condition of impending bypass.

SUMMARY OF THE INVENTION

The present invention is therefore concerned with improvements in fuel filters provided with bypass valves, wherein mechanical indicators are provided, either solely or in conjunction with electrical signalling devices, to indicate a clogged condition of the filter elements. Further, the invention is concerned with the provision of mechanical indicators of this type, wherein the indicators can be reset to a normal position only after the fuel filter element has been removed.

Accordingly, it is an object of the present invention to provide a filter means of the type described above, having a bypass valve and a mechanical indicator for signalling a clogged condition of the filter elements.

Another object of the present invention resides in a fuel filter having a bypass valve and mechanical indicating means, wherein the indicating means cannot be reset to a normal position without first removing the filter element.

A further object of the present invention resides in a fuel filter assembly having a bypass valve, in which electrical signalling devices are supplemented with mechanical indicators to indicate a clogged condition of the fuel filter elements.

Still another object of the present invention is to provide a fuel filter assembly having a bypass valve, in which electrical signalling means are employed, together with mechanical means, to provide a fail-safe device for indicating a clogged condition of the filter elements.

Finally, it is an object of the present invention to provide a fuel filter assembly having a bypass valve, in which indicating means are employed to signal a condition of impending bypass flow of the fuel.

These and other objects, features and advantages of the present invention will become more obvious from the following description, when taken in connection with the accompanying drawings which show, for purpose of illustration only, four embodiments in accordance with the present invention, and wherein.

Figure 1:
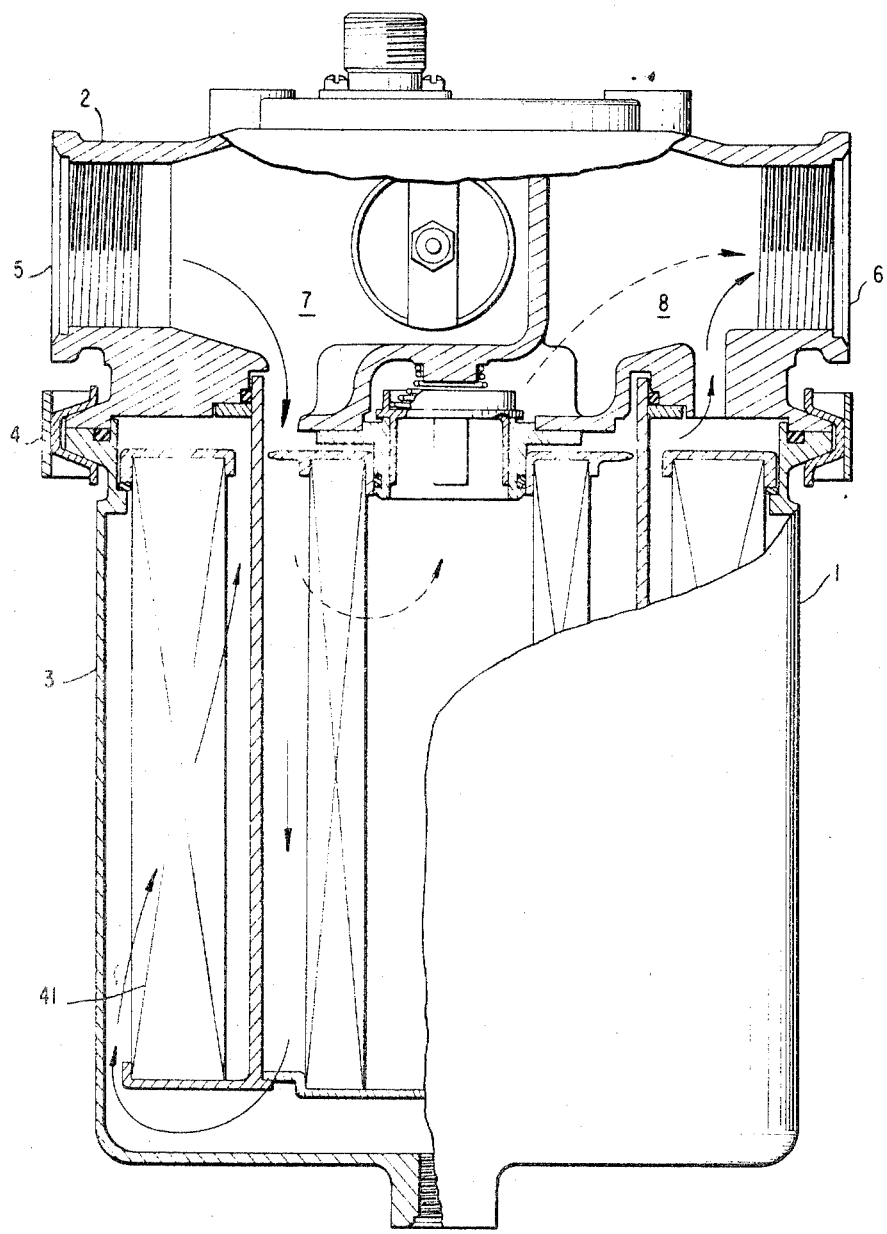
FIGURE 1 is a cross-sectional elevation view of a filter means of the type contemplated by the present invention.
Figure 2:
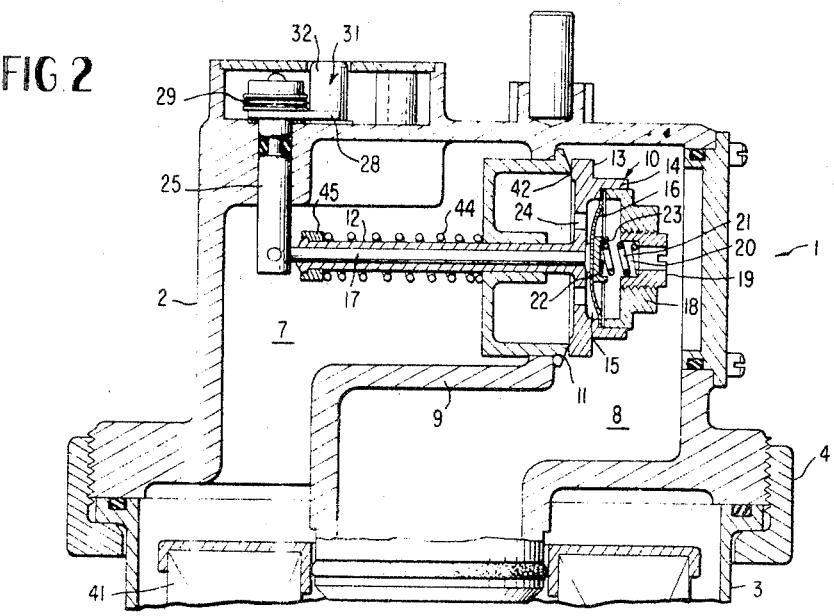
FIGURE 2 is a cross-sectional view illustrating the details of a bypass valve in accordance with the present invention.

Referring now to the drawing, wherein like reference numerals are used throughout to designate like parts, a filter unit generally indicated at 1 is illustrated as having a top casing member 2 and a lower casing member 3 releasably secured to the member 2 by a suitable coupling 4. An inlet port for the fluid to be filtered is generally designated at 5 and an outlet port therefor at 6. Removable filter elements 41, of conventional construction, are provided within the normal path of fluid flow through the filter means, which is indicated generally by the arrows in FIGURE 1. As shown in FIGURE 2, the member 2 is divided into an inlet chamber 7 and an outlet chamber 8 by an integral partition 9. The partition 9 is formed to provide for a passage for fluid downwardly around its lower portion and upwardly into the outlet chamber 8, as illustrated in FIGURE 2.

A bypass valve assembly, generally designated as 10, is provided in an opening 11 of partition 9 to control the passage of fluid between chambers 7 and 8. The valve assembly 10, as illustrated in FIGURE 2, includes a hollow stem 12 which is integral with a valve member 13. Valve member 13 includes a rim portion 14 defining a recess 15. Positioned within recess 15 is a pressure responsive diaphragm and plunger assembly, including a diaphragm 16 connected by suitable means to one end of a plunger 17. The plunger 17 extends through the hollow valve stem 12 and is freely slidable therein. The diaphragm 16 is secured in position by an insert 18, which is affixed by suitable means to the rim portion 14 of the valve member 13. A plug 19, having a recess 20 therein, is held in position within the insert 18. A coil spring 21 is seated at one end against the inner surface of plug 19 in recess 20. The other end of the spring 21 is seated in a recess 22, formed in a guide member 23, which is rigidly attached to the diaphragm 16. Thus, the spring 21 serves to apply pressure to diaphragm 16 to bias the same toward the left, as viewed in FIGURE 2. The valve member 13 is provided with a plurality of ports 24 which admit pressurized fluid from the inlet chamber 7 to contact the surface of diaphragm 16.

Figure 3:
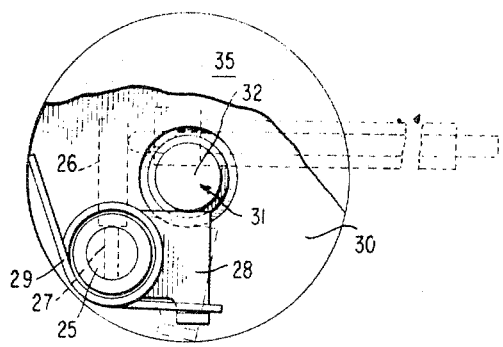
FIGURE 3 is a partially cut-away top plan view of the filter means as shown in FIGURE 2.

Associated with the plunger 17 is a rotatable shaft 25, extending through and supported by the upper surface of casing member 2. As shown in FIGURE 3, a crank arm 26 is secured, as by a press fit, at 27, to the shaft 25 at a height which enables crank arm 26 to engage the end of plunger 17.

Secured to the upper end of shaft 25, as by means of a press fit, is a latch member 28. Engaging latch member 28 is one end of a torsional spring 29, the opposite end of which is secured to a wall of a recess 30 formed in the upper surface of casing member 2, to accommodate the upper end of shaft 25. The torsional spring 29 serves to bias the latch member 28 in a clockwise direction, as viewed in FIGURE 3. Under normal conditions, with the filter elements 41 in a non-clogged condition, the bias of the spring 21 in the bypass assembly acts to cause the plunger 17 to engage the crank arm 26 with sufficient tangential force as to exert a moment upon shaft 25 in the counter-clockwise direction, as viewed in FIGURE 3, thereby preventing clockwise rotation thereof under the action of torsional spring 29.

Associated with the latch member 28 is an indicating button mechanism 31, including a cylindrical button 32, which is biased upwardly by a coil spring 33 and may project through an opening 34 in a cover 35, which is secured over recess 30 in the upper surface of casing member 2. In accordance with the embodiment of FIGURE 6, the lower portion of the cylindrical button 32 includes a conically-shaped sleeve portion 46 which is tapered, from a flat land surface 37 at the upper end thereof, down to a base 47 which truncates the conical shape of sleeve portion 46.

Figure 4:
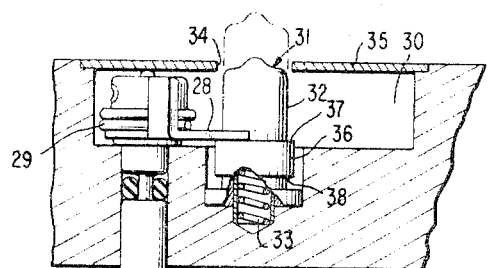
FIGURE 4 is a partial cross-sectional view illustrating the indicating means according to one embodiment of the invention.

In the embodiment of FIGURE 4, the lower portion of the cylindrical button 32 includes a cylindrical sleeve portion 36, having flat land surfaces 37 and 38 at the upper and lower ends respectively thereof.

Surrounding hollow stem 12 of valve member 13 is a compression spring 44. One end of spring 44 abuts the body of valve member 13. At its other end, spring 44 abuts pillow block 45, rigidly attached to stem portion 12.

Figure 5:
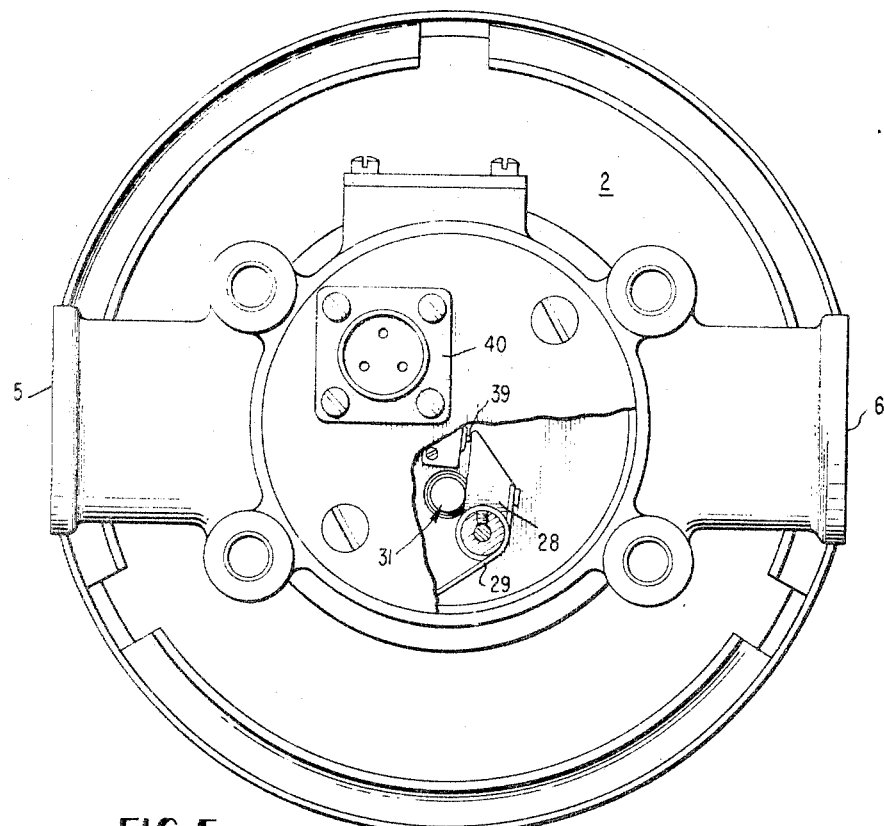
FIGURE 5 is a partially cut-away top plan view of the filter means incorporating an alternative embodiment of this invention.

FIGURE 5 illustrates an alternative embodiment of this invention, wherein, in addition to the indicating button mechanism 31 engaging with the latch member 28, the actuating mechanism 39 of a microswitch assembly 40 is aligned so as to engage, simultaneously with the indicating button mechanism 31, with the latch member 28. The details of the microswitch assembly are not shown herein, as any suitable assembly of that type may be utilized.

OPERATION

Figure 6:
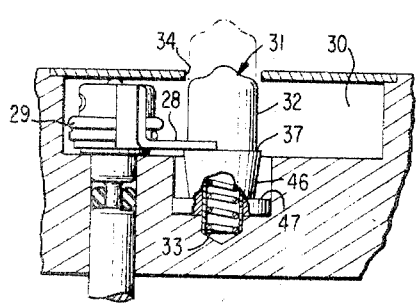
FIGURE 6 is a partial cross-sectional view illustrating the indicating means according to an alternative embodiment to that described in FIGURE 4.

The operation of the filter means, as shown by FIGURES 1, 2, 3, 4 and 6, is as follows:

Under normal operating circumstances, with the filter elements 41 in a clean condition, pressurized fluid enters the filter assembly through the inlet port 5 and is received in the inlet chamber 7. After passing through the filter elements 41, the fluid passes to the outlet chamber 8 and out of the filter means through outlet port 6, generally as indicated by the flow lines in FIGURE 1. Under these conditions, only a slight pressure differential is active upon diaphragm 16 of bypass valve assembly 10. Thus, the spring load of coil spring 21 is sufficient to retain plunger 17 in a retracted position. In this position, plunger 17 engages crank arm 26 to rotate shaft 25 in a counterclockwise direction (as viewed in FIGURE 3), thus overcoming the force exerted by torsional spring 29, which tends to rotate shaft 25 in a clockwise direction. Under these circumstances, latch member 28 is forced into engagement with indicating button mechanism 31 at a point just above the upper land surface 37 (as indicated in FIGURES 4 and 6). As a result, the cylindrical button 32 is retained in a depressed condition, overcoming the upward bias of coil spring 33.

After fluid contamination has caused a substantial clogging of filter elements 41, a decrease in fluid pressure occurs on the outlet side of diaphragm 16 and the pressure on the inlet side of diaphgram 16 then causes the diaphragm to be moved to the right (as viewed in FIGURE 2). This movement occurs when the level of the pressure differential between the inlet and outlet sides of diaphragm 16, together with the force of torsional spring 29, exceeds the force of coil spring 21. At this point, plunger 17 moves forward (to the right, as viewed in FIGURE 2), permitting a clockwise rotation of shaft 25. Ultimately, shaft 25 rotates to such an extent as to disengage latch member 28 from the upper land surface 37 (as indicated in dash and dot lines in FIGURE 3). At this point, the cylindrical button 32 moves upward under the load of coil spring 33 and projects through opening 34 in cover member 35, thereby becoming visible from the outside of the filter assembly.

It is to be noted that, at this point, although the indicating means are in a position which signal a clogged condition of the filter elements, the valve member 13 has, as yet, not become unseated so as to allow the flow of unfiltered fluid. Thus is can be seen that the visible indication is provided by the filter assembly of the present invention at a time just prior to the bypass flow of unfiltered fuel. More accurately, the indicating means signal a condition of impending bypass flow.

As the pressure differential between the inlet and outlet sides of diaphragm 16 continues to increase, the force developed ultimately exceeds the force exerted by compression spring 44 and results in the movement of valve member 13 away from valve seat 42, thereby allowing unfiltered fluid to flow from inlet chamber 7 to outlet chamber 8 through port 11. As this occurs, the pressure differential is reduced, thereby causing diaphragm 16, under the urging of coil spring 21, to move to the left (as viewed in FIGURE 2). This movement causes plunger 17 to move leftward and into engagement with crank arm 26, thus effecting a counter-clockwise rotation of shaft 25. As shaft 25 rotates counter-clockwise, latch member 28 is forced into engagement with cylindrical button 32 between the tapered walls of conically-shaped sleeve portion 46 and the base 47 of cylindrical button 32 (as seen in FIGURE 6).

Due to the tapered configuration of conically-shaped sleeve portion 46, cylindrical button 32 may be reset manually by one of the service personnel who has noted button 32 protruding through opening 34 and cover 35. The resetting can be accomplished merely by applying force to the top of button 32 sufficient to overcome the force exerted by coil spring 33 and to force latch member 28 away from button 32 momentarily. After button 32 has been depressed sufficiently, latch 28 will again positively engage button 32 above upper land surface 37.

In the embodiment according to FIGURE 4, the bypass flow of fluid causes the engagement of latch member 28 with cylindrical button 32 just below the lower land 38 of cylindrical sleeve portion 36. As a result of the positive engagement of latch member 28 below the cylindrical sleeve portion 36 of cylindrical button 32, external force applied to the top of cylindrical button 32 from the outside of the filter assembly is unavailing for purposes of returning the cylindrical button 32 to its normal position. Therefore, if one of the service personnel should attempt to depress cylindrical button 32, he would be unable to accomplish this without first effecting a clockwise rotation of shaft 25. Shaft 25, it is to be noted, is inaccessible from the exterior surface of the filter assembly due to cover 35 of recess 30. Thus, the only manner in which the clockwise rotation of shaft 25 can be accomplished is by the manipulation of its lower portion. The shaft 25 is so arranged within the filter assembly that in order to gain access to the lower portion of said shaft, the lower casing member 3 and the filter elements 41 must first be removed. Once such steps have been taken, the knurled portion 43 at the lower end of shaft 25 can then be rotated in a clockwise direction manually. Next, cylindrical button 32 can be depressed manually, until latch member 28 is again positioned upon the upper land 37 of the cylindrical sleeve portion 36.

In the alternative embodiment illustrated in FIGURE 5, the actuating mechanism 39 of a microswitch 40 is aligned with the minor diameter of cylindrical button 32. Thus, under normal operating circumstances, latch member 28, seated upon upper land 37, retains cylindrical button 32 in a depressed position, and, at the same time, contacts actuating mechanism 39 of microswitch assembly 40 to convey an electrical signal indicating normal operating conditions. The microswitch assembly employed may be either of the normally-open or normally-closed type. If a normally-closed type microswitch is employed, and connected with a lamp or other signal in the instrument panel, the failure of the lamp or other signal alerts the service personnel to examine the filter assembly. An examination of the mechanical indicator of the filter assembly quickly determines whether the failure of the lamp or other signal was due to a clogged condition of the filter elements or was, in fact, due to a failure of the electrical device. Thus, the combination of the two indicators serves to provide a fail-safe mechanism.

When the mechanical indicator in accordance with FIGURE 4 is employed in combination with the electrical signalling means according to FIGURE 5, it is essential that the portion of the cylindrical button 32 below the lower land 38 of the cylindrical sleeve portion 36 has a diameter greater than that of the portion above the upper land 37. By virtue of this construction, it will be noted that when plunger 17 is retracted by the action of coil spring 21 under bypass conditions, latch member 28, forced into engagement with the lower portion of cylindrical button 32, will not engage with actuating mechanism 39 of microswitch assembly 40 to falsely indicate a normal condition of the filter elements.

Similarly, if the mechanical indicator in accordance with FIGURE 6 is used in conjunction with the electrical signalling means of FIGURE 5, the conically-shaped sleeve portion 46 should be tapered such that, at its lowermost end, wherein it is truncated by base 47, the diameter exceeds slightly the diameter of the portion of cylindrical button 32 above upper land surface 37.

While I have shown and described four embodiments in accordance with the present invention, it is understood that the same is not limited thereto, but is susceptible of numerous changes and modifications as known to a person skilled in the art, and we therefore do not wish to be limited to the details shown and described therein, but intend to cover all such changes and modifications.

We claim:

1. Filter means for fluids such as gasoline, comprising:

top casing means having an opening therein,
removable lower casing means,
fluid inlet means and fluid outlet means,
at least one removable filter element positioned between said fluid inlet means and said fluid outlet means,
a bypass assembly, providing an alternate flow path for fluid when said filter element is clogged, said bypass assembly including a valve and pressure responsive means operatively connected with said valve, said pressure responsive means being exposed, on one side thereof, to the pressure of fluid on the inlet side of said filter element, and on the other side thereof, to the pressure of fluid on the outlet side of said filter element, and mechanical indicating means actuated by said pressure responsive means and operable to be positively locked in a position visible from the exterior of said filter means with the fluid pressure differential between said inlet side and said outlet side of said filter element, being at most substantially equal to a first predetermined level of fluid pressure differential to indicate proper operating conditions of the filter, and said first level of fluid pressure differential being slightly less than a second predetermined level of fluid pressure differential, at which said valve of said bypass assembly begins to be unseated, said mechanical indicating means comprises a spring-loaded button which projects through said opening in said top casing means at a pressure differential in excess of said first predetermined level of fluid pressure differential, said spring-loaded button being provided with a cylindrical sleeve portion having flat upper and lower land surfaces, rotatable shaft means, latch means affixed to said rotatable shaft means and extending radially therefrom, said rotatable shaft means being positioned relative to said spring-loaded button such that said latch means may be positively engaged with a land surface of said cylindrical sleeve portion of said spring-loaded button, torsional spring means affixed to said rotatable shaft means, said torsional spring means biasing said rotatable shaft means so as to move said latch means away from said spring-loaded button, and means interconnecting said pressure responsive means with said rotatable shaft means, said interconnecting means acting upon said rotatable shaft means to cause engagement of said latch means with said spring-loaded button under normal flow conditions.

2. Filter means according to claim 1, further comprising:

first coil spring means acting upon said pressure-responsive means to cause said rotatable shaft means to be positioned such that said latch means positively engages with said spring-loaded button.

3. Filter means according to claim 2, wherein said interconnecting means comprises:

crank arm means affixed to said rotatable shaft means and extending radially therefrom, and plunger means, affixed at one end to said pressure responsive means, the opposite end of said plunger means adapted to engage with said crank arm means to effect rotation of said rotatable shaft means.

4. Filter means according to claim 3, further comprising second coil spring means, acting upon said valve to cause said valve to remain seated, said second coil spring means having a force greater than the force differential between said first coil spring means and said torsional spring means.

5. Filter means according to claim 4, further comprising:

electrical signalling means, said means including an actuating member aligned with the portion of said spring-loaded button above said upper land surface of said cylindrical sleeve portion thereof, said portion of said spring-loaded button having a diameter slightly smaller than the diameter of the portion of said spring-loaded button below said sleeve portion, said actuating member engaging with said latch means simultaneously with the engagement of said latch means with the portion of said spring-loaded button above said sleeve portion thereof.

6. Filter means according to claim 5, wherein said electrical signalling means comprises a normally-closed microswitch assembly.

7. Filter means according to claim 5, wherein said electrical signalling means comprises a normally-open microswitch assembly.

8. Filter means according to claim 1, wherein said rotatable shaft means is inaccessible from the top casing of said filter means, the lower end of said rotatable shaft means being accessible only upon removal of said filter elements, said lower end of said rotatable shaft means being knurled.

9. Filter means according to claim 1, wherein said mechanical indicating means is actuated to indicate clogged filter conditions prior to complete opening of the alternate flow path at a level of fluid pressure differential at most equal to said second predetermined level.

10. Filter means according to claim 1, further comprising latch means for locking said indicating means in said first-mentioned position, and mechanical connecting means operatively connecting said pressure responsive means with said latch means to unlock said indicating means at a fluid pressure differential between said inlet side and said outlet side at most equal to said second predetermined level.

11. Filter means according to claim 10, further comprising means associated with said indicating means to prevent external resetting thereof.

12. Filter means according to claim 11, further comprising electrical indicating means also actuated by said latch means.

13. Filter means according to claim 1, further comprising means associated with said indicating means to prevent external resetting thereof.

14. Filter means according to claim 1, wherein said indicating means is operable to indicate impending bypass condition in said bypass assembly.

15. Filter means for fluids such as gasoline, comprising:

top casing means having an opening therein, removable lower casing means, fluid inlet means and fluid outlet means, at least one removable filter element positioned between said fluid inlet means and said fluid outlet means, a bypass assembly, providing an alternate flow path for fluid when said filter element is clogged, said bypass assembly including a valve and pressure responive means operatively connected with said valve, said pressure responsive means being exposed, on one side thereof, to the pressure of fluid on the inlet side of said filter element, and on the other side thereof, to the pressure of fluid on the outlet side of said filter element, and mechanical indicating means actuated by said pressure responsive means and operable to be positively locked in a position visible from the exterior of said filter means with the fluid pressure differential between said inlet side and said outlet side of said filter element, being at most substantially equal to a first predetermined level of fluid pressure differential to indicate proper operating conditions of the filter, and said first level of fluid pressure differential being slightly less than a second predetermined level of fluid pressure differential, at which said valve of said bypass assembly begins to be unseated, said mechanical indicating means comprises a spring-loaded button which projects through said opening in said top casing means at a pressure differential in excess of said first predetermined level of fluid pressure differential, said spring-loaded button being provided with a conically-shaped sleeve portion having a flat upper land surface and a tapered sidewall and being truncated at its lowermost end, rotatable shaft means, latch means affixed to said rotatable shaft means and extending radially therefrom, said rotatable shaft means being positioned relative to said spring-loaded button such that said latch means may be positively engaged with a land surface of said cylindrical sleeve portion of said spring-loaded button, torsional spring means affixed to said rotatable shaft means, said torsional spring means biasing said rotatable shaft means so as to move said latch means away from said spring-loaded button, and means interconnecting said pressure responsive means with said rotatable shaft means, said interconnecting means acting upon said rotatable shaft means to cause engagement of said latch means with said spring-loaded button under normal flow conditions.

16. Filter means according to claim 15, further comprising:

first coil spring means acting upon said pressure-responsive means to cause said rotatable shaft means to be positioned such that said latch means positively engages with said spring-loaded button.

17. Filter means according to claim 16, wherein said interconnecting means comprises:

crank arm means affixed to said rotatable shaft means and extending radially therefrom, and plunger means, affixed at one end to said pressure responsive means, the opposite end of said plunger means adapted to engage with said crank arm means to effect rotation of said rotatable shaft means.

18. Filter means according to claim 17, further comprising second coil spring means, acting upon said valve to cause said valve to remain seated, said second coil spring means having a force greater than the force differential between said first coil spring means and said torsional spring means.

19. Filter means according to claim 18, further comprising:

electrical signalling means, said means including an actuating member aligned with the portion of said spring-loaded button above said conically-shaped sleeve portion thereof, said tapered sidewall of said conically-shaped sleeve portion having a diameter at its smallest point slightly greater than the portion of said spring-loaded button above said upper land surface of said conically-shaped sleeve portion, said actuating member engaging with said latch means simultaneously with the engagement of said latch means with the portion of said spring-loaded button above said conically shaped sleeve portion thereof.

20. Filter means according to claim 19, wherein said electrical signalling means comprises a normally-closed microswitch assembly.

21. Filter means according to claim 19, wherein said electrical signalling means comprises a normally-open microswitch assembly.

22. Filter means according to claim 15, wherein said rotatable shaft means is inaccessible from the top casing of said filter means, the lower end of said rotatable shaft means being accessible only upon removal of said filter elements, said lower end of said rotatable shaft means being knurled.

23. Indicating means for a fluid filter having an inlet and an outlet with at least one removable filter element therebetween, and a bypass valve, comprising:

cylindrical button means, biased in the direction of elevation to a position visible from the exterior of said fluid filter, latch means associated with said button means, said latch means being adapted to engage with a projection on said button means, so as to restrain said button means in a retracted position under conditions of normal fluid flow through said fluid filter, means operatively interconnecting said latch means with said bypass valve, including a rotatable shaft, said latch means being fixed rigidly to said shaft near the upper end thereof, and a crank arm fixed rigidly to said shaft and extending radially therefrom, said crank arm being aligned vertically on said shaft to cause engagement of said latch means with said projetion on said button means under conditions of fluid flow through said fluid filter, and torsional means arranged so as to exert a force of lesser magnitude and opposed to the force exerted by said interconnecting means.

24. Indicating means according to claim 23, wherein said projection on said button means comprises a cylindrical sleeve portion having flat upper and lower land portions, the diameter of the portion of said button means below said sleeve portion being slightly larger than the diameter of the portion thereof above said sleeve portion.

25. Indicating means according to claim 23, wherein said projection on said button means comprises a conically-shaped sleeve portion having a flat upper land portion and a tapered sidewall, the diameter of the conically-shaped sleeve portion at its smallest point being slightly larger than the diameter of the portion of said button above said upper land portion of said conically-shaped sleeve.

26. Indicating means according to claim 25, wherein said means interconnecting said bypass valve with said latch means comprises:

a flexible diaphragm positioned within said bypass valve and fixed thereto, one side of said diaphragm being exposed to the fluid pressure on the inlet side of said bypass valve, the reverse side of said diaphragm being exposed to the fluid pressure on the outlet side of said bypass valve, a plunger rigidly connected to said flexible diaphragm, and adapted to engage with said plunger.

27. Indicating means according to claim 26, further comprising electrical signalling means, said electrical signalling means having an actuating device positioned so as to engage with said latch member simultaneously with the engagement of said latch member with the portion of said button means above said conically-shaped sleeve portion thereof.

28. Indicating means according to claim 24, wherein said means interconnecting said bypass valve with said latch means comprising:

a flexible diaphragm positioned within said bypass valve and fixed thereto, one side of said diaphragm being exposed to the fluid pressure on the inlet side of said bypass valve, the reverse side of said diaphragm being exposed to the fluid pressure on the outlet side of said bypass valve, a plunger rigidly connected to said flexible diaphragm, and adapted to engage with said plunger.

29. Indicating means according to claim 28, further comprising electrical sgnalling means, said electrical signalling means having an actuating device positioned so as to engage with said latch member simultaneously with the engagement of said latch member with the portion of said button means above said cylindrical sleeve portion thereof.

References Cited

UNITED STATES PATENTS

| 2,935,040 | 5/1960  | Steensen      | 210—90 X |
| 2,998,138 | 8/1961  | Mould et al.  | 210—90   |
| 3,052,206 | 9/1962  | Scavuzzo      | 210—90 X |
| 3,080,972 | 3/1963  | Smith         | 210—90   |
| 3,146,757 | 9/1964  | Heymann et al.| 210—90 X |
| 3,154,049 | 10/1964 | Smith et al.  | 210—90 X |
| 3,200,787 | 8/1965  | Darnell       | 210—90 X |

SAMIH N. ZAHARNA, Primary Examiner

U.S. Cl. X.R.

116—70; 210—91, 130